(12) United States Patent
Sulkowski

(10) Patent No.: US 7,387,104 B2
(45) Date of Patent: Jun. 17, 2008

(54) INTERNAL COMBUSTION ENGINE WITH DIRECT GASOLINE INJECTION AND CONTROLLED IGNITION

(75) Inventor: Pascal Sulkowski, Rueil Malmaison (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 263 days.

(21) Appl. No.: 10/551,824

(22) PCT Filed: Mar. 19, 2004

(86) PCT No.: PCT/FR2004/050114

§ 371 (c)(1),
(2), (4) Date: Oct. 3, 2005

(87) PCT Pub. No.: WO2004/090320

PCT Pub. Date: Oct. 21, 2004

(65) Prior Publication Data

US 2007/0000474 A1 Jan. 4, 2007

(30) Foreign Application Priority Data

Apr. 4, 2003 (FR) ..................................... 0304227

(51) Int. Cl.
*F02B 3/00* (2006.01)

(52) U.S. Cl. .................... 123/305; 123/299; 123/301
(58) Field of Classification Search ................ 123/294, 123/295, 299, 301, 305, 568.11–568.14; 701/103, 104, 105, 108; 73/117.3, 118.1
See application file for complete search history.

(56) References Cited

U.S. PATENT DOCUMENTS

| | | | |
|---|---|---|---|
| 3,526,212 A | 9/1970 | Bassot et al. | |
| 3,741,175 A | 6/1973 | Rouger | |
| 4,417,469 A | 11/1983 | Stevenson et al. | |
| 4,444,166 A | 4/1984 | Kovacs et al. | |
| 4,467,757 A | 8/1984 | Dazzi | |
| 4,621,599 A | 11/1986 | Igashira et al. | |
| 5,271,229 A | 12/1993 | Clarke et al. | |
| 5,826,425 A * | 10/1998 | Rossi Sebastiano et al. | .. 60/274 |
| 5,992,353 A | 11/1999 | Posselt | |
| 6,138,638 A | 10/2000 | Morikawa | |
| 6,439,210 B1 | 8/2002 | Faletti et al. | |

(Continued)

FOREIGN PATENT DOCUMENTS

DE 10007659 A 9/2001

(Continued)

*Primary Examiner*—Willis R. Wolfe
*Assistant Examiner*—Johnny H. Hoang
(74) *Attorney, Agent, or Firm*—Nicolas E. Seckel

(57) ABSTRACT

An internal combustion engine with direct gasoline injection and controlled ignition, having at least one cylinder, a cylinder head, sealing the cylinder, a piston, arranged to run in the cylinder, a combustion chamber, defined by the piston and the cylinder head, a gasoline injector into the combustion chamber, an ignition device, for producing an ignition of the air/gasoline mixture in the combustion chamber, inlet and exhaust valves, selectively sealing the combustion chamber and a system for recirculation of at least a part of the exhaust gas into the combustion chamber during the air intake phase, wherein the pressure provided for the injection device is greater than 250 bars, such as to homogenize the air/gasoline/recycled exhaust gas mixture and increase the speed of combustion.

18 Claims, 2 Drawing Sheets

U.S. PATENT DOCUMENTS

Figure 1:
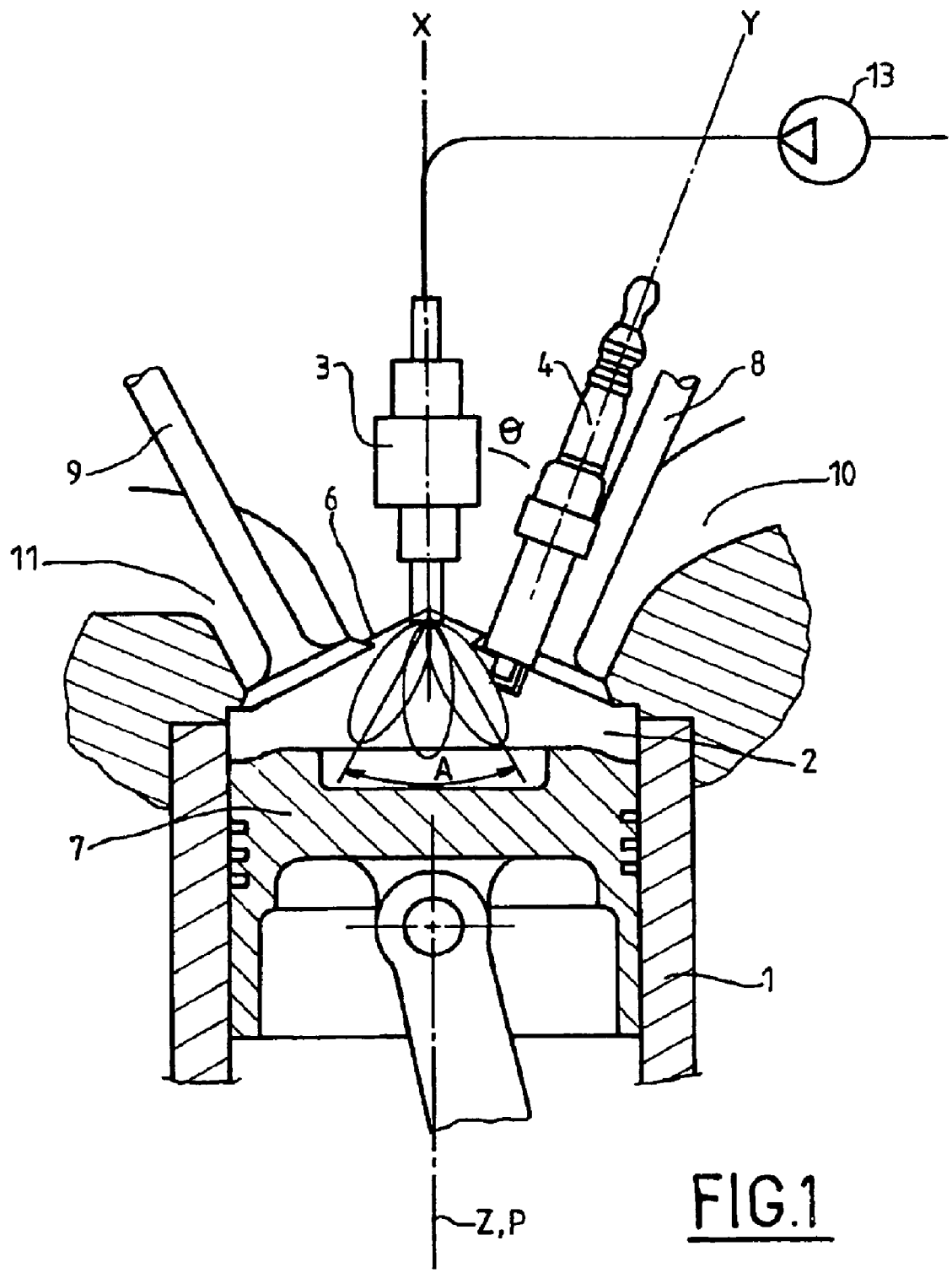

| | | |
|---|---|---|
| 6,543,409 B2 | 4/2003 | Bertsch et al. |
| 6,543,706 B1 | 4/2003 | Hutchings et al. |
| 6,629,519 B1 * | 10/2003 | Bertsch et al. ............. 123/305 |
| 6,826,903 B2 * | 12/2004 | Yahata et al. ................. 60/278 |
| 6,907,856 B2 * | 6/2005 | Bourguignon et al. ...... 123/276 |
| 7,278,392 B2 | 10/2007 | Zillmer et al. |
| 2001/0015192 A1 | 8/2001 | Urushihara et al. |
| 2002/0026923 A1 | 3/2002 | Bezner et al. |
| 2002/0046741 A1 | 4/2002 | Kakuho et al. |
| 2003/0019466 A1 | 1/2003 | Walter et al. |
| 2007/0125337 A1 * | 6/2007 | Robinet ...................... 123/299 |
| 2007/0266978 A1 | 11/2007 | Duverger et al. |

FOREIGN PATENT DOCUMENTS

| | | | |
|---|---|---|---|
| EP | 1004764 A | | 5/2000 |
| EP | 1074714 A | | 2/2001 |
| EP | 1085192 A | | 3/2001 |
| EP | 10006640 A | | 3/2001 |
| EP | 1108868 A | | 6/2001 |
| EP | 1128048 A | | 8/2001 |
| FR | 2 806 450 | * | 3/2001 |
| FR | 2806450 A | | 9/2001 |
| FR | 2 830 570 | * | 10/2001 |
| FR | 2814199 A | | 3/2002 |
| FR | 2830570 A | | 4/2003 |

* cited by examiner

INTERNAL COMBUSTION ENGINE WITH DIRECT GASOLINE INJECTION AND CONTROLLED IGNITION

The invention concerns an internal combustion engine with direct gasoline injection and controlled ignition.

The invention concerns more particularly an internal combustion engine, with direct gasoline injection and controlled ignition, comprising at least one cylinder, a cylinder head closing the cylinder, a piston sliding in the cylinder, a combustion chamber defined between the piston and the cylinder head, means for injecting gasoline into the combustion chamber, ignition means intended to produce an ignition of the air-gasoline mixture in the combustion chamber, intake and exhaust valves, selectively closing the combustion chamber, and means for recirculating at least a portion of the exhaust gases into the combustion chamber during the air intake phase.

Various modes of operation in connection to the injection strategy can be envisioned thanks to the direct injection of gasoline.

One of the known solutions is the introduction of fuel in stoichiometric proportions, so that the totality of the fuel is burned upon contact with the air. According to this solution, the fuel is introduced early enough during the intake phase of the engine cycle to ensure good evaporation and a good homogeneity of the load.

In this mode of operation, it is interesting to introduce into the combustion chamber, at the time of intake, burned gases from the exhaust (also called recirculated gases). These gases do not participate in the combustion but they make it possible to reduce the density of the fuel mixture (gasoline-air) and thus to reduce the loss of energy during the engine cycle.

However, the reintroduction of burned gases has drawbacks: the air-gasoline-recirculated gases mixture is not homogeneous and the combustion speed is reduced. These two effects result in a degradation of the combustion efficiency. The maximum amount of burned gases that it is possible to reintroduce to improve consumption is thus limited.

An objective of the present invention is to remedy all or part of the drawbacks of the prior art mentioned above.

To this effect, the internal combustion engine, with direct gasoline injection and controlled injection according to the invention, which is otherwise conform to the generic definition given in the preamble above, is essentially characterized in that the pressure provided to the injection means is above 250 bars, so as to homogenize the air-gasoline-recirculated gases mixture and to increase the combustion speed.

Further, the invention can comprise one or several of the following characteristics:

- The exhaust gases reintroduced into the combustion chamber represent a residual ratio above 20%, and preferably comprised between 40 and 60%,
- at least a portion of the recirculated exhaust gases is reintroduced into the combustion chamber by a so-called "external" route (EGR), i.e., via a derivation conduit,
- at least a portion of the recirculated gases is reintroduced into the combustion chamber by a so-called "internal" route (IGR), i.e., by appropriate control of the intake and exhaust valves.
- the gasoline injection means and the ignition means are separated by a distance comprised between 5 and 30 millimeters.
- the injection means and the ignition means are disposed in the cylinder head according to two respective axes forming an angle above 35°.
- the injection means inject gasoline during the intake phase of the engine cycle.

Figure 2:
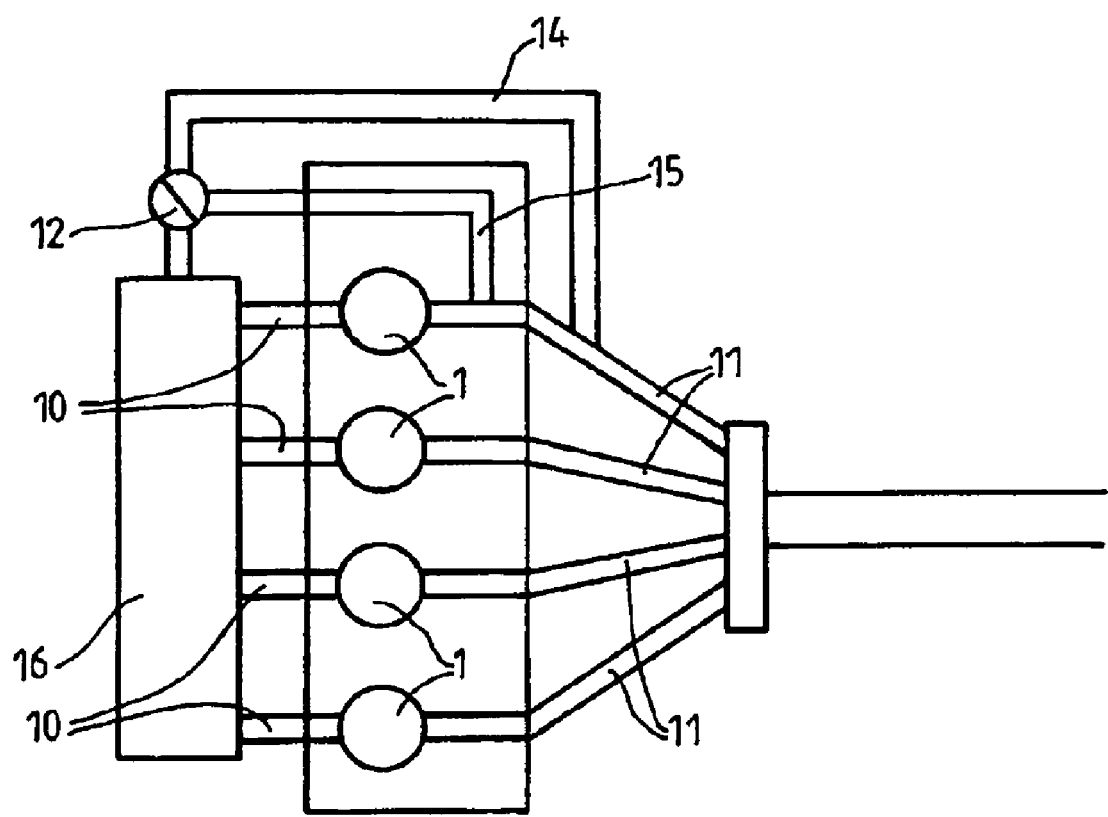

Other particularities and advantages will appear upon reading the following description made in reference to the drawings in which:

FIG. 1 is a schematic and partial cross-section view of an internal combustion engine according to the invention, FIG. 2 is a schematic top view of an engine comprising a known exhaust gas recycling device by a so-called "external" route.

The engine according to the invention shown on FIG. 1 comprises at least one cylinder 1, a cylinder head 6 closing the cylinder 1, and a piston 7 slidingly arranged in the cylinder 1. A combustion chamber 2 is defined between the piston 7 and the cylinder head 6.

The engine comprises also a gasoline injection means 3, such as a nozzle or an injector which opens into the combustion chamber 2. The injector 3 is supplied by an injection pump 13 intended to provide pressurized gasoline to injector 3. Ignition means 4, such as a spark plug, plunge also into the combustion chamber 2 for producing an ignition of the air-gasoline mixture in the combustion chamber 2 at a determined time.

According to a charateristic of the invention, the pressure of the gasoline provided to the injector 3 is above 250 bars. The injector 3 can be disposed, for example, on the symmetry axis Z of the cylinder 1, such as shown on FIG. 1. The spark plug can be disposed at a distance comprised between 5 and 30 millimeters of the injector 3. According to this arrangement, the injector 3 is diposed, in the cylinder head 6, along an axis X, and the spark plug 4 is disposed along an axis Y. The angle θ between the axis X of the injector 3 and the axis Y of the spark plug 4 is under 35°.

Other arrangements, not shown, of the injector 3 and the spark plug 4 can be envisioned. For example, the angle θ between the axis X of the injector 3 and the axis Y of the spark plug 4 is above 35°, and, preferably, equal to about 60°. The injector 3 and the spark plug 4 can be disposed in particular on opposite sides of the symmetry axis Z of the cylinder 1.

The engine comprises also one or several intake valves 8 and one or several exhaust valves 9 selectively closing passages between the combustion chamber 2 and, respectively, an intake conduit 10 and an exhaust conduit 11.

In addition, the engine is characterized in that it comprises means for recirculating at least a portion of the exhaust gases.

During injection of the high pressure gasoline according to the invention, a strong turbulence is observed in the combustion chamber 2, far above those of conventional arrangements. This turbulence makes it possible to increase the folding of the flame front and thus the flame surface in contact with the fuel mixture.

The strong turbulence, generated by the high gasoline pressure, allows higher combustion speeds for a given ratio of burned gases. Thus, it will be possible to obtain combustion of acceptable quality with high ratios of recirculated gases. It will be possible to have a residual ratio of exhaust gases reintroduced into the combustion chamber 2 above 20% and, according to a preferred embodiment, comprised between 40 and 60%.

Further, the high pressure delivered makes it possible to inject a large amount of fuel thanks to the good atomization obtained. This characteristic makes it possible also to obtain a very homogeneous fresh air-burned gases-air mixture quickly.

The engine according to the invention has the advantage that it reduces fuel consumption thanks to the more important recirculation of exhaust gases.

Two known means for recirculating burned gases can be envisioned: either by the so-called "external" route (EGR), as shown on FIG. 2, or by the so-called "internal" route (IGR).

According to the configuration by the so-called "external" route, the burned gases can be taken according to two modes.

As a variant, the burned gases can be taken in the area of the exhaust conduits 11. The gases are reintroduced subsequently upstream from the intake collector 16 via a derivation conduit 14.

The burned gases can be taken via an internal conduit 15 in the area of the cylinder head 6. The gases are subsequently reintroduced upstream of the intake collector 16.

In both cases, the amount of reintroduced exhaust gases is controlled by a regulation valve 12 controlled by an engine calculator (ECU), not shown. The burned gases mix with the fresh air. This mixture is introduced into the combustion chamber during the intake phase.

According to the configuration by the so-called "internal" route, the burned gases can be introduced by appropriate control of the intake valves 8 and exhaust valves 9. In a known manner, when a combustion cycle is completed, the exhaust valves 9 open so as to release the burned gases. In order to recuperate a portion of the burned gases, the intake valves 8 open during the gas exhaust phase. At that time, the pressure in the exhaust conduit 11 is substantially higher than the pressure observed in the intake conduit 10.

This pressure difference triggers an aspiration of the burned gases into the intake conduit 10 during the phase corresponding to the common opening of the intake valves 8 and exhaust valves 9. The opening of the intake valve 8 continues after the closing of the exhaust valve 9. During this period, the burned gases sucked into the intake conduit 10 are reintroduced into the combustion chamber 2.

The control of the amount of reintroduced burned gases is obtained by controlling the opening of the intake valve 8. The use of camshaft phase-shifting systems makes it possible, for example, to capture into the engine large amounts of burned gases (up to 80% by weight).

Preferably, the gasoline injection is made, in a preferential manner, during a very short period, as close as possible to the ignition instant. In particular, it will be possible to have the gasoline injection take place during the compression phase of the engine cycle. Thus, the strong turbulence generated by the gasoline jet will be maintained and amplified during the beginning of combustion. The use of an injection pressure above 250 bars ensures a good homogeneity of the mixture in spite of the late time of injection.

The performance of the engine, at full load, will be improved also by adapting the shape of the intake conduits 10. Since it is no longer required that the aerodynamics be generated by the intake conduits, it will be possible to optimize their shape to ensure a better filling of the engine under heavy load.

The invention claimed is:

1. Internal combustion engine, with direct gasoline injection and controlled ignition, comprising:
   at least one cylinder,
   a cylinder head closing the cylinder,
   a piston slidingly arranged in the cylinder,
   a combustion chamber defined between the piston and the cylinder head,
   means for injecting gasoline into the combustion chamber,
   means for ignition intended to produce an ignition of an air-gasoline mixture in the combustion chamber,
   intake valves and exhaust valves, selectively closing the combustion chambers, and
   means for recirculating at least a portion of exhaust gases into the combustion chamber during an air intake phase,
   wherein a pressure provided to the injection means is above 250 bars, so as to homogenize an air-gasoline-recirculated exhaust gases mixture and to increase a combustion speed.

2. Engine according to claim 1, wherein the exhaust gases reintroduced into the combustion chamber represent a residual ratio above 20%.

3. Engine according to claim 1, wherein at least a portion of the recirculated exhaust gases is reintroduced into the combustion chamber by a so-called "external" route (EGR), i.e., via a derivation conduit.

4. Engine according to claim 1, wherein at least a portion of the recirculated exhaust gases is reintroduced into the combustion chamber via a so-called "internal" route (IGR), i.e., by appropriate control of the intake valves and exhaust valves.

5. Engine according to claim 1, wherein the gasoline injection means and the ignition means are separated by a distance comprised between 5 and 30 millimeters.

6. Engine according to claim 1, wherein the injection means and the ignition means are disposed in the cylinder head according to two respective axes forming an angle ($\theta$) above 35°.

7. Engine according to claim 1, wherein the injection means inject gasoline during the compression phase of the engine cycle.

8. Engine according to claim 1, wherein the injection means inject gasoline during the intake phase of the engine cycle.

9. Engine according to claim 2, wherein the exhaust gases reintroduced into the combustion chamber represent a residual ratio comprised between 40 and 60%.

10. Method of controlling injection in an internal combustion engine with direct gasoline ignition, said engine comprising at least one cylinder, a cylinder head closing the cylinder, a piston slidingly arranged in the cylinder, a combustion chamber defined between the piston and the cylinder head, and intake valves and exhaust valves, selectively closing the combustion chamber, said method comprising:
   injecting gasoline into the combustion chamber at a pressure above 250 bars,
   producing an ignition of an air-gasoline mixture in the combustion chamber, recirculating at least a portion of exhaust gases into the combustion chamber during an air intake phase,
   so as to homogenize air-gasoline-recirculated exhaust gases mixture and to increase a combustion speed.

11. Method according to claim 10, wherein the exhaust gases reintroduced into the combustion chamber represent a residual ratio above 20%.

12. Method according to claim 10, wherein at least a portion of the recirculated exhaust gases is reintroduced into the combustion chamber by a so-called "external" route (EGR), i.e., via a derivation conduit.

13. Method according to claim 10, wherein at least a portion of the recirculated exhaust gases is reintroduced into the combustion chamber via a so-called "internal" route (IGR), i.e., by appropriate control of the intake valves and exhaust valves.

14. Method according to claim 10, wherein the location where gasoline is injected and the location where ignition is performed are separated by a distance comprised between 5 and 30 millimeters.

15. Engine according to claim 10, wherein an axis of injection and an axis of ignition are disposed in the cylinder head forming an angle ($\theta$) above 35°.

16. Engine according to claim 10, wherein gasoline is injected during the compression phase of the engine cycle.

17. Engine according to claim 10, wherein gasoline is injected during the intake phase of the engine cycle.

18. Engine according to claim 11, wherein the exhaust gases reintroduced into the combustion chamber represent a residual ratio comprised between 40 and 60%.

* * * * *